United States Patent [19]

Smith

[11] 4,300,347

[45] Nov. 17, 1981

[54] SHUT-OFF VALVE ARRANGEMENT FOR A GAS TURBINE ENGINE FUEL

[75] Inventor: Trevor S. Smith, Sutton Coldfield, England

[73] Assignee: Lucas Industries Limited, Birmingham, England

[21] Appl. No.: 121,681

[22] Filed: Feb. 15, 1980

[30] Foreign Application Priority Data

Mar. 1, 1979 [GB] United Kingdom ............... 7244/79

[51] Int. Cl.³ .......................................... F02C 7/22
[52] U.S. Cl. .............................. 60/39.28 R; 91/426
[58] Field of Search ............... 60/243, 261, 39.28 R; 137/596.15; 251/25, 30; 91/426

[56] References Cited

U.S. PATENT DOCUMENTS

| | | | |
|---|---|---|---|
| 3,253,516 | 5/1966 | Huntington | 91/426 |
| 3,393,508 | 7/1968 | Ray | 91/426 |
| 3,866,416 | 2/1975 | Lewis | 60/261 |

*Primary Examiner*—Robert E. Garrett

[57] ABSTRACT

A shut-off valve arrangement for a gas turbine engine fuel supply system includes a shut-off valve in a fuel supply line to the engine, and a drain valve communicating with said supply line downstream of the shut-off valve. Said shut-off valve and drain valve are responsive to a servo pressure signal which is applied through flow restrictors such that the drain valve shuts before the shut-off valve, but opens after the shut-off valve.

4 Claims, 1 Drawing Figure

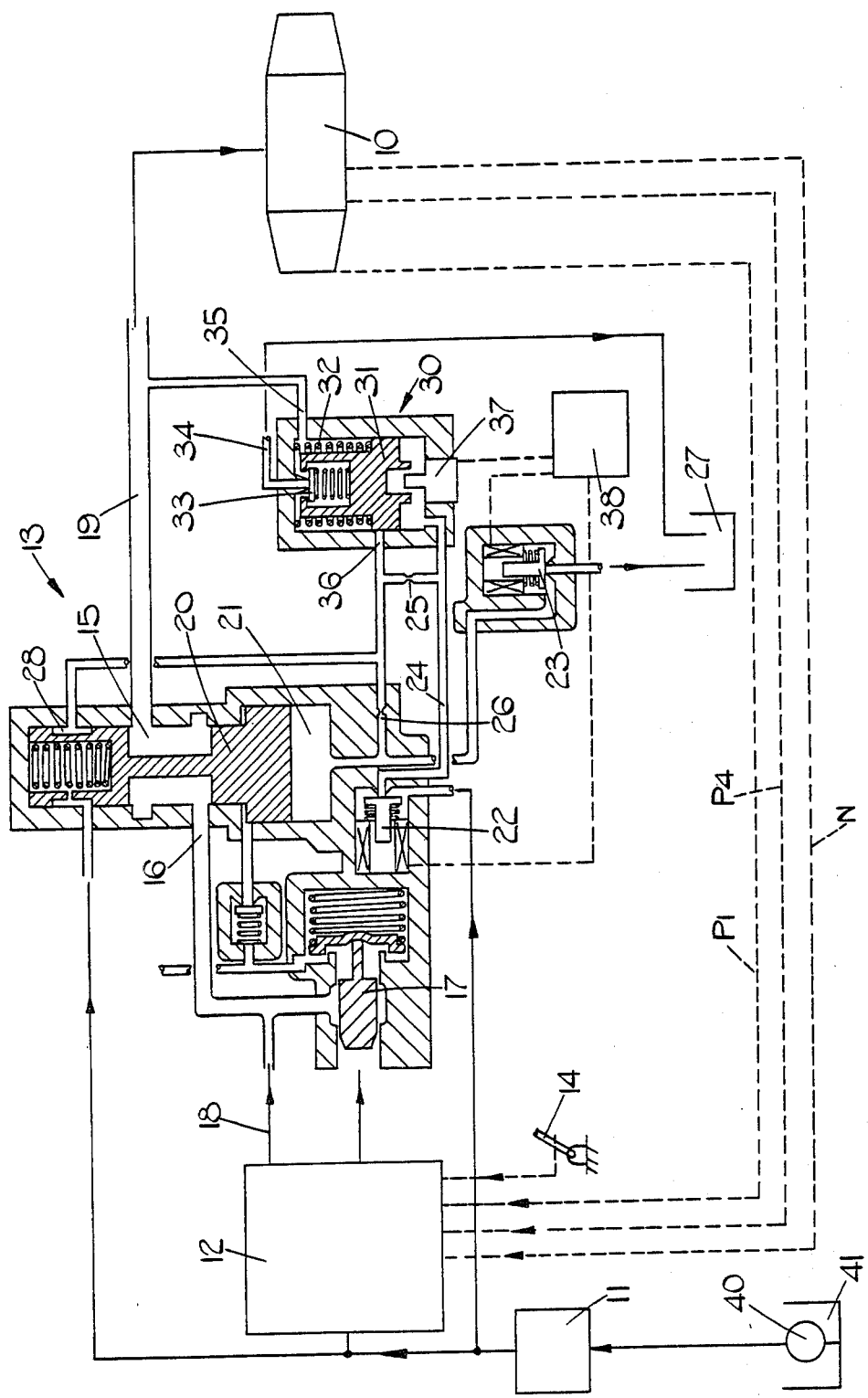

SHUT-OFF VALVE ARRANGEMENT FOR A GAS TURBINE ENGINE FUEL

This invention relates to a shut-off valve arrangement for a gas turbine engine fuel system.

It is known, for example from British Pat. No. 1,474,909, to provide a shut-off valve downstream of a metering valve in a gas turbine fuel system, the shut-off valve having a drain connection which communicates with the engine burners when the shut-off valve is operated to shut off fuel supply to the engine. In this position of the shut-off valve the residual pressure of hot gas in the engine forces fuel back from the burners and through the shut-off valve to the drain, whereby the fuel passages between the shut-off valve and the burners are purged of fuel. The flow of hot residual gas continues after purging of fuel has been completed. In this condition the purge flow portions of the shut-off valve retain a fuel film which can dry to a solid deposit under the influence of the continuing hot gas flow. This solid deposit may also be contaminated with combustion solids from the engine.

As shown in the foregoing patent, the shut-off valve may be servo operated under control of a pilot valve, and the purge fuel flow may pass through both the pilot valve and the shut-off valve to the drain connection. In this case either the pilot valve or shut-off valve, or both, are in danger of accumulating solid deposits which may cause seizure of the valves.

It is an object of the present invention to provide a servo operated shut-off valve arrangement for a gas turbine engine fuel control system, in which purge flow does not pass through the shut-off valve or through its associated pilot valve.

According to the invention a shut-off valve arrangment for a gas turbine engine fuel system comprises a shut-off valve having an outlet passage through which fuel can flow to the engine, and a control member movable in response to an increase in a servo pressure signal to an open position to permit fuel flow through said outlet passage, a drain valve having a drain outlet, an inlet port communicating with said outlet passage and a control element responsive to an increase in said servo pressure signal to prevent flow from said outlet passage to said drain outlet, and a servo pressure control arrangement for selectively increasing or decreasing said servo pressure signal.

In a preferred embodiment said drain valve includes a second inlet port for connection to a source of fuel pressure for said engine, said drain valve control element being operable to shut said second inlet port when flow between said first inlet and said drain outlet is prevented.

In a particular embodiment said servo pressure signal control means comprises a pilot valve for applying said servo pressure to said shut-off valve control member, and auxiliary valve means operable by said shut-off valve control member for applying said servo pressure to said control member when said shut-off valve is open, whereby operation of said pilot valve to open said shut-off valve causes the latter to be maintained open by the pressure applied through said auxiliary valve means.

An embodiment of the invention will now be described by way of example only and with reference to the accompanying drawing which shows, diagrammatically, a fuel control system for a gas turbine engine.

A gas turbine engine 10 is supplied with fuel from a pump 11 by way of a metering arrangement 12 and a shut-off valve arrangement, indicated at 13. The metering arrrangement 12 is responsive to the position of an engine speed selector device 14, engine speed N, engine compressor inlet pressure P1 and engine compressor delivery pressure P4.

The shut-off valve arrangement 13 comprises a shut-off valve 15 having an inlet passage 16 which communicates with the metering arrangement 12 by way of a pressurising valve 17. The passage 16 also communicates with a supply line 18 for a reduced, idling fuel flow. The shut-off valve 15 also includes an outlet passage 19 through which fuel can flow to the engine 10. The valve 15 further includes a control member 20 responsive to a decrease in a servo pressure in a chamber 21 to shut the valve 15 and thereby prevent flow to the passage 19.

The servo pressure in chamber 21 is derived from a fuel supply pressure at the outlet of the pump 11 by means of a pilot valve arrangement which comprises two springloaded electro-magnetic valves 22, 23, the spring biasing of these valves being such that they are shut in their de-energised conditions. The inlet of valve 22 communicates with the outlet of pump 11, and the outlet of this valve communicates with the chamber 21 by way of a passage 24 and flow restrictors 25, 26. The control member 20 of the shut-off valve 15 includes an auxiliary valve 28 between the outlet of the pump 11 and the connection between the restrictors 25, 26, the valve 28 being open when the shut-off valve 15 is open. By this means, energisation of the valve 22 to admit the fuel supply pressure to chamber 21, and thereby to open the shut-off valve 15 also causes the fuel supply pressure to be applied to chamber 21 through the valve 28 and restrictor 26. The shut-off valve 15 is thereby maintained open if the valve 22 is subsequently shut. Valve 15 may be shut by opening the valve 23 to reduce the pressure in chamber 21. Shutting valve 15 also causes auxiliary valve 28 to shut, and valve 15 will thus remain shut even when valve 23 is subsequently de-energised.

A dump valve 30 includes a piston actuator 31 responsive to the pressure in the passage 24, the actuator 31 being biased against this pressure by a spring 32. A plate closure member 33 is spring-mounted on the actuator 31 so as to be self-aligning with a drain outlet 34. An inlet 35 communicates with the outlet passage 19 from the shut-off valve 15. A further inlet 36 is positioned so as to be shut-off by the piston actuator 31 when the latter is in a position to cause the closure member 33 to shut the drain outlet 34. A transducer 37 provides an electrical control circuit 38 with signals indicating the state of the valve 30. The electro-magnetic valves 22, 23 are also under control of the circuit 38.

Assuming an initial condition in which the valve 15 has been shut, the low pressure in passage 24 will cause the dump valve 30 to open. The passage 24 thus communicates with the drain tank 27 through the restrictor 25 and valve 30. The outlet passage 19 from the valve 15 also communicates with the tank 27 through the valve 30. The shut condition of valve 15 and the open condition of valve 30 are thus maintained even after the valve 23 has been de-energised.

When the engine is to be started, valve 22 is energised to allow delivery pressure from the pump 11 to be applied to passage 24. At start-up the pump 11 may initially deliver air and fuel vapour, the pressure of this mixture being insufficient to lift the piston actuator 31 of the valve 30 against the spring 32. The air/vapour mixture thus passes through the restrictor 25 and inlet 36 to the drain outlet 34. The pressure in chamber 21 thus remains low and is insufficient to open the valve 15. The outlet passage 19 remains in communication with the drain tank 27. When the delivery pressure of the pump 11 is sufficiently high to overcome the spring 32, the actuator 31 lifts, shutting off the inlet 36 and the drain outlet 34. The pressure in passage 24 is then applied through the restrictors 25, 26 of the chamber 21 to open the valve 15. Fuel may then pass from the metering arrangement 12 to the engine 10, initially through the line 18, and subsequently through the pressurising valve 17. As previously described, the valve 15 is maintained open by pressure applied to the chamber 21 through the auxiliary valve 28 and restrictor 26, and the valve 22 may be de-energised when the valve 15 is open. The dump valve 30 may thus act, during engine start, as a vent valve for removing an initial delivery by the pump 11 of the air and vapour.

When the engine is to be shut down the valve 23 is energised shutting valve 15 and opening valve 30, the opening of valve 30 being delayed by the restrictors 25, 26. Residual hot gas under pressure in the combustion chamber of the engine 10 then urges fuel back from the engine burners, through the valve 30 to the drain tank 27, urging fuel from at least that portion of the passage 19 between the engine 10 and the valve 30. After this purging has been completed residual hot gas may continue to flow through the valve 30, but cannot enter the valve 15 or the valves 22, 23. Hot gas flow cannot, therefore, cause contamination of these valves by solidified fuel deposits and the products of combustion from the engine 10.

Action of the valve 30 as a vent valve ensures that the pump 11 will be effective to charge the system with fuel even in the event of failure of a boost pump 40 within a reservoir 41 from which fuel for the system is drawn.

I claim:

1. A shut-off valve arrangement for a gas turbine engine fuel system, comprising a shut-off valve having an outlet passage through which fuel can flow to the engine, and a control member movable in response to an increase in a servo pressure signal to an open position to permit fuel flow through said outlet passage, a drain valve having a drain outlet, an inlet port communicating with said outlet passage and a control element responsive to an increase in said servo pressure signal to prevent flow from said outlet passage to said drain outlet, and a servo pressure signal control means for selectively increasing or decreasing said servo pressure signal, said servo pressure signal control means comprising a first pilot valve for applying said servo pressure signal to said shut-of valve control member and to said drain valve control element, and auxiliary valve means operable by said shut-off valve control member for applying said servo pressure signal to said control member and said control element when said shut-off valve is open, whereby operation of said pilot valve to open said shut-off and drain valves causes these valves to be maintained open by pressure applied through said auxiliary valve means.

2. An arrangement as claimed in claim 1 which includes a second pilot valve for venting said servo pressure signal.

3. An arrangement as claimed in claim 1 or claim 3 in which said drain valve includes a second inlet port for connection to a source of pressurised fuel for said engine, said drain valve control element being operable to shut said second inlet port when flow between said first inlet port and said drain outlet is prevented.

4. An arrangement as claimed in claim 3 in which said servo pressure signal is derived from said fuel pressure source and which includes a flow restriction through which said second inlet communicates with said first pilot valve.

* * * * *